United States Patent

Chimner et al.

[11] Patent Number: 5,234,376
[45] Date of Patent: Aug. 10, 1993

[54] SPIRAL SPRING OF A TORSIONAL DAMPER

[75] Inventors: Thomas D. Chimner, Rochester; Michael J. Otto, Kalamazoo; Jerry F. Baremor, Marshall; Warren G. Bopp, Farmington Hills, all of Mich.

[73] Assignee: Eaton Corporation, Cleveland, Ohio

[21] Appl. No.: 872,853

[22] Filed: Apr. 23, 1992

[51] Int. Cl.⁵ ............................................. F16D 3/80
[52] U.S. Cl. ........................... 464/27; 192/3.29; 192/106.1; 464/58
[58] Field of Search ............... 464/24, 27, 57–60; 192/3.28, 3.29, 3.33, 106.1

[56] References Cited

U.S. PATENT DOCUMENTS

| 187,424 | 2/1877 | Slicer . | |
|---|---|---|---|
| 2,114,247 | 4/1938 | Davis | 192/68 |
| 3,091,447 | 5/1963 | Donkin | 267/1 |
| 3,208,303 | 9/1965 | Durouchoux | 74/572 |
| 3,246,485 | 4/1966 | Chapman . | |
| 4,181,208 | 1/1980 | Davis | 192/106.1 |
| 4,768,637 | 9/1988 | Bopp et al. | 192/106.1 |
| 4,782,936 | 11/1988 | Bopp | 192/106.2 |
| 5,078,648 | 1/1992 | Stretch | 464/27 |
| 5,078,649 | 1/1992 | Leichliter et al. | 464/27 |
| 5,085,617 | 2/1992 | Stretch | 464/27 |

FOREIGN PATENT DOCUMENTS

| 1953196 | 4/1970 | Fed. Rep. of Germany | 464/58 |
|---|---|---|---|
| 2611013 | 2/1987 | France . | |

Primary Examiner—Daniel P. Stodola
Assistant Examiner—William G. Battista, Jr.
Attorney, Agent, or Firm—P. S. Rulon

[57] ABSTRACT

A torsion isolator assembly (30) for reducing driveline torsionals includes a vane damper (36) having valving (40d,40e) for regulating the damping factor of the damper, spiral springs (32,34 or 82,84), and cam surfaces (44d,44c) which engage the ends of the spiral springs (32,34 or 82,84).; The spiral springs (32,34 or 82,84) have a lesser radial spacing between the outer convolutions as compared to the radial spacing between the inner convolutions.

5 Claims, 3 Drawing Sheets

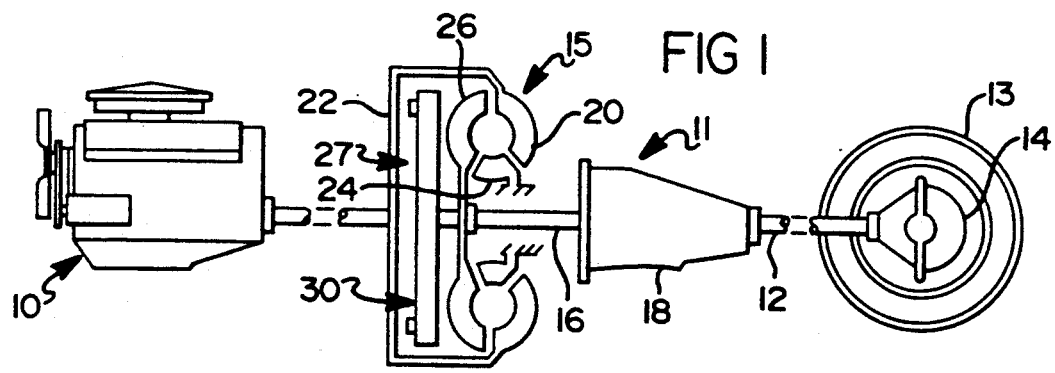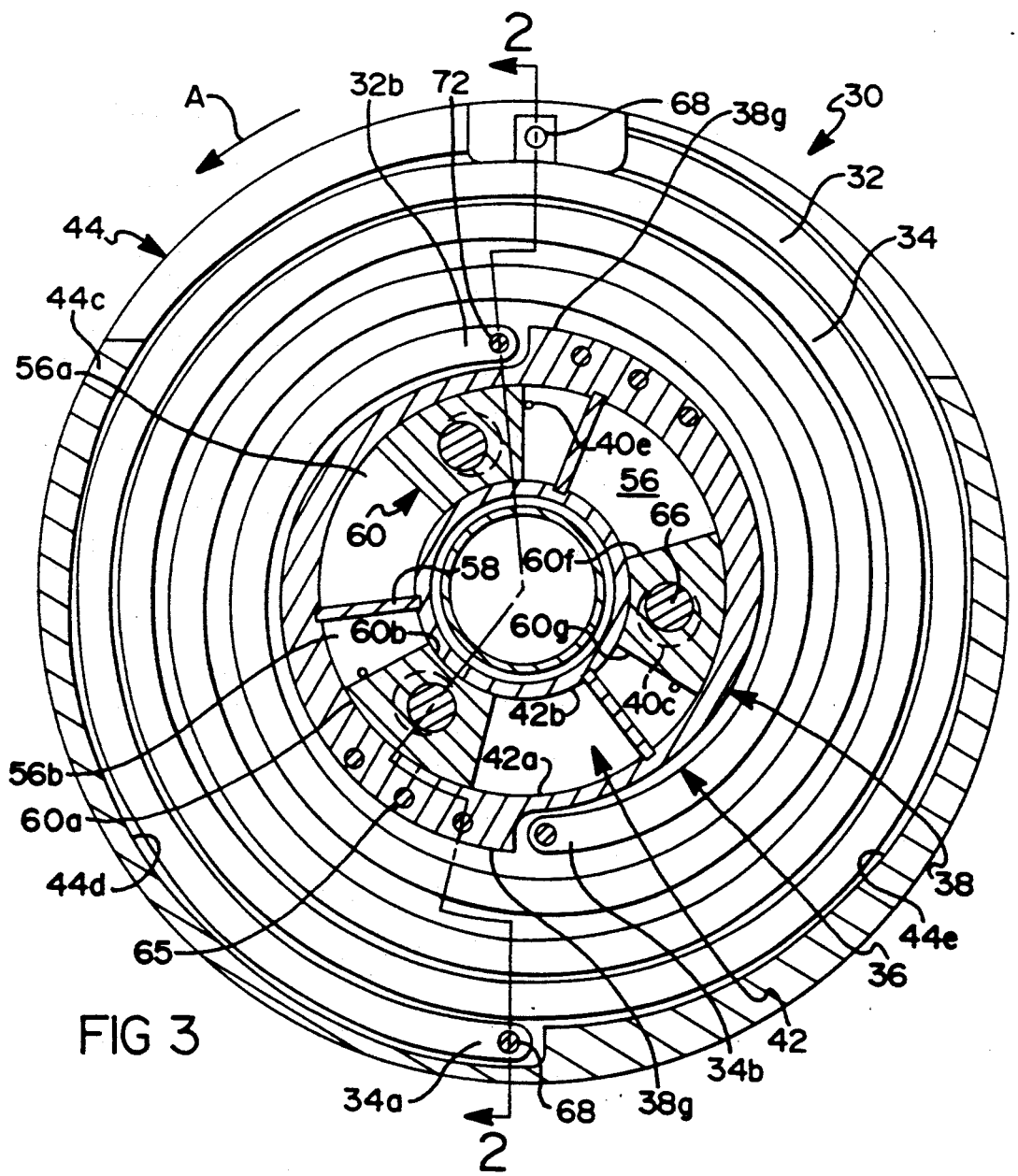

SPIRAL SPRING OF A TORSIONAL DAMPER

CROSS REFERENCE

This application is related to U.S. application Ser. Nos. 07/872,876 and 07/872,860, filed Apr. 23, 1992, and both assigned to the assignee of this application.

FIELD OF THE INVENTION

This invention relates to an improved flat, spiral wound spring in a rotating application. More specifically, this invention relates to such a spring disposed in parallel with a damper mechanism for use in a vehicle driveline.

BACKGROUND OF THE INVENTION

It is well-known that the speed of an Otto or Diesel cycle engine output or crankshaft varies even during so-called steady-state operation of the engine, i.e., the shaft continuously accelerates and decelerates about the average speed of the shaft. The accelerations and decelerations are, of course for the most part, a result of power pulses from the engine cylinders. The pulses may be of uniform frequency and amplitude when cylinder charge density, air/fuel ratio, and ignition are uniform. However, such uniformity does not always occur, thereby producing pulses which vary substantially in frequency and amplitude. Whether uniform or not, the pulses, which are herein referred to as torsionals, are transmitted through vehicle drivelines and to passengers in vehicles. The torsionals, which manifest themselves as vibrations, are detrimental to drivelines and derogate passenger-ride quality. Further, when an engine is abruptly accelerated and/or decelerated by accelerator pedal movement or other factors, torque pulses ring through the driveline and also derogate ride quality, such pulses are herein also referred to as torsionals.

Since the inception of automobiles, many torsional isolator mechanisms have been proposed and used to isolate and dampen driveline torsionals. The isolator mechanism proposed in U.S. Pat. No. 5,078,649 includes, as does the isolator mechanism herein, flat, long travel spiral springs connected in parallel with a vane damper device. Both mechanisms are disposed i a torque converter housing and immersed in the pressurized torque converter oil therein. U.S. Pat. No. 5,078,649 is incorporated herein by reference. The amount of damping (i.e., damping factor) provided by the vane damper device in this patent has been considered marginal in some applications due to cost and reliability of a valving arrangement therein, and the spiral springs therein have also been considered of marginal life expectancy due to high stresses in some applications during certain operating conditions. The springs disclosed herein may be employed with other than vane damper devices and the vane damper device herein may be employed with other than spiral springs.

The isolator mechanism disclosed herein includes features for overcoming the above mentioned disadvantages.

SUMMARY OF THE INVENTION

An object of this invention is to provide a torsion isolator assembly having improved springs for reducing stress due to centrifugal forces.

According to a feature of this invention, a torsion isolator assembly is adapted to be serially connected between input and output drives of a driveline. The assembly includes a damping mechanism and resilient means connected in parallel. The damping mechanism includes first and second assemblies respectively adapted for driving connection with the input and output drives independent of the resilient means. The first and second assembles are mounted for relative to-and-fro rotation about a common axis in response to relative to-and-fro rotation of the drives effected by flexing of the resilient means and operative to damp flexing of the resilient means. The resilient means includes at least two springs having nested spiral convolutions disposed in a common plane normal to the axis with radially adjacent surfaces of the nested convolutions radially spaced apart during a relaxed state of the springs. Each spring has a radially outer end of each convolution connected to the first assembly and a radially inner end of each convolution connected to the second assembly. Each convolution has of at least three hundred degrees length about the axis.

The improvement is characterized by the spring convolutions being formed such that the radially adjacent surfaces of the nested convolutions for substantially one-half of each convolution length from the outer ends having a lesser radial spacing therebetween than a remainder of the convolutions.

BRIEF DESCRIPTION OF THE DRAWINGS

The torsion isolator assembly of the present invention is shown in the accompanying drawings in which:

FIG. 1 schematically illustrates a motor vehicle driveline including a torque converter type transmission employing a torque converter bypass drive embodying the torsion isolator assembly;

FIG. 3 is a reduced size detailed sectional view of the isolator assembly looking along staggered section line 3—3 of FIG. 2;

DETAILED DESCRIPTION OF THE DRAWINGS

Figure 2:
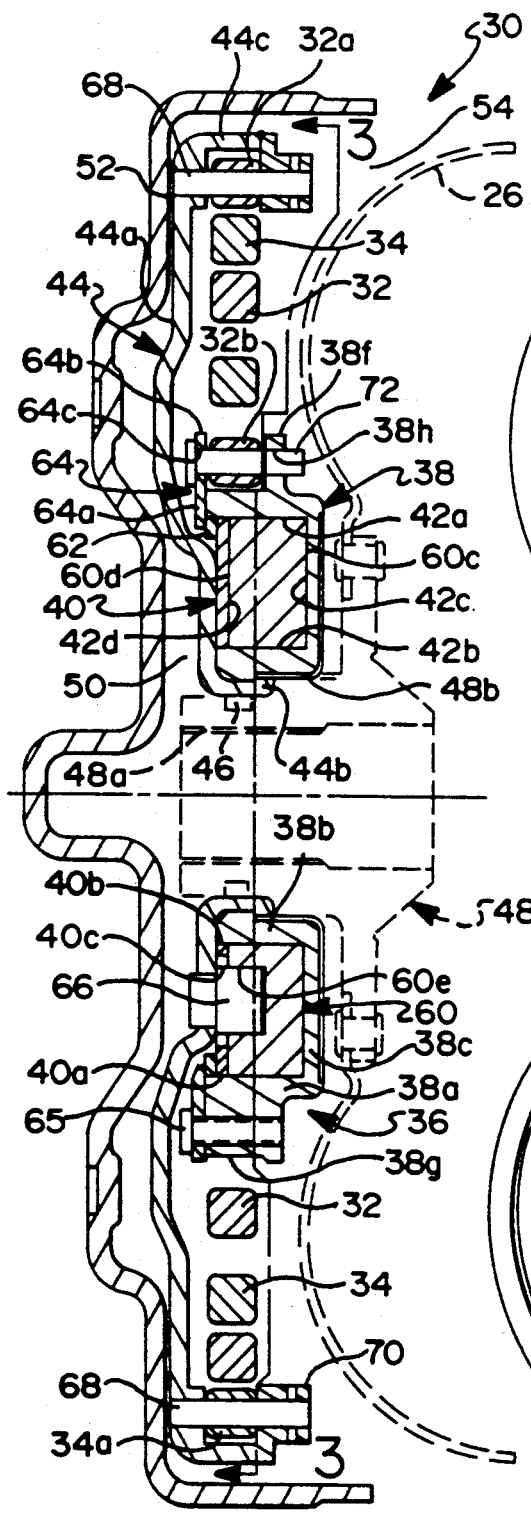
FIG. 2 is a detailed sectional view of the isolator assembly looking along staggered section line 2—2 of FIG. 3.

The motor vehicle driveline seen schematically in FIG. 1 includes an internal combustion engine 10, an automatic transmission 11 and a drive shaft 12 driving a load such as rear or front wheels 13 of a vehicle through a differential 14.

The transmission includes a torque converter assembly 15 having an output shaft 16 and a gear ratio box 18 driven by the torque converter output shaft 16. Torque converter assembly 15 is filled with automatic transmission fluid and includes, in known manner, an impeller 20 driven from engine 10 through a torque converter housing 22, a stator 24, and a turbine 26 driven hydrokinetically by the impeller. A fluid coupling may be employed in lieu of a torque converter.

Torque converter assembly 15 further includes a bypass driveline seen generally at 27 in FIG. 1. Bypass driveline 27 is operative when selectively actuated to provide a bypass drive between torque converter housing 22 and torque converter output shaft 16 through a torsion damping isolator assembly 30 thereby bypassing the high slippage drive path through the torque converter.

Figure 4:
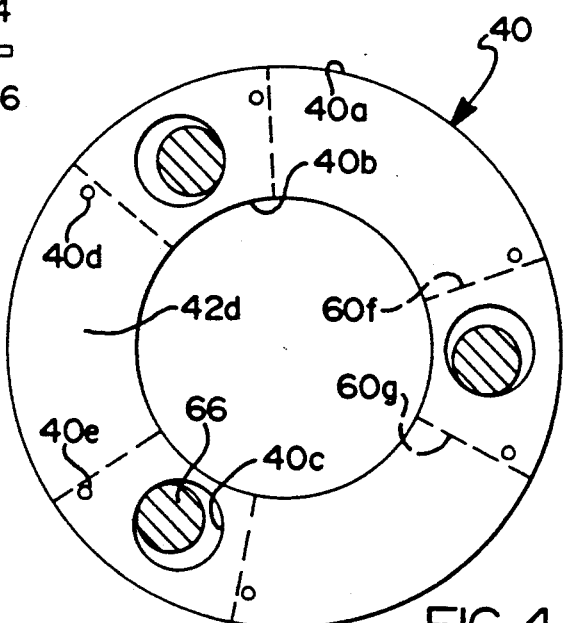
FIG. 4 is a sectioned view of a portion of the isolator mechanism looking leftward in FIG. 2.

Referring now to FIGS. 2-4, isolator assembly 30 includes a pair of nested, flat, spiral wound springs 32,34 disposed normal to the axis of the assembly, and a vane type damper mechanism 36 including housing members 38,40 defining an annular chamber 42, and a clutch or piston plate 44. Plate 44 includes a radially extending portion 44a having an axially extending hub portion 44b at its center and an axially extending flange portion 44c at its radially outer edge. An outer cylindrical surface of hub portion 44b has an inner cylindrical surface of housing member 38 journaled therein to maintain concentricity between the plate and housing. An inner cylindrical surface of hub portion 44b cooperates with an O-ring seal 46 carried in an annular recess in an outer surface of an adapter 48. The adapter is affixed to torque converter turbine 26 and includes internal splines 48a for mating with splines on shaft 16 and external splines 48b for slidably mating with splines on housing member 38.

During non-bypass operation of the torque converter, pressurized transmission oil is admitted to the torque converter via a chamber 50 receiving the oil through passages in shaft 16 in known manner. The oil in chamber 50 prevents frictional engagement of plate 44 with a friction lining 52 affixed to the shown portion of torque converter housing 22. The oil thus flows radially outward in chamber 50 past lining 52 and into the torque converter via a main torque converter chamber 54 separated from chamber 50 by plate 44. When it is desired to engage the isolator assembly, as for example, when the vehicle is operating in a higher gear ratio and above a predetermined vehicle speed, the direction of flow of the pressurized oil is reversed by actuation of a suitable valve, now shown. Specifically, the pressurized oil is now admitted first to chamber 564 where it acts against the radially extending portion 44a of plate 44 and slides the entire isolator assembly to the left to frictionally engage line 52. Driveline torque now bypasses the torque converter and is transmitted to shaft 16 by spiral springs 32,34 which flex to attenuate torsional sin the torque. Damper assembly controls the rate of flexing of the springs.

Annular chamber 42 includes radially spaced apart cylindrical surfaces 42a,42b defined by axially extending annular wall portions 38a,38b of housing member 38, and axially spaced apart end surfaces 42c,42d respectively defined by a radially extending portion 38c of housing member 38 and housing member 40. Annular chamber 42 is divided into three arcuate chambers 56 sealed from each other by fixed vanes or walls 58. The walls are press fit into grooves in wall portions 38a,38b,38c and extend radially and axially across the annular chamber. The radially outer extent of axially extending wall 38a includes a radially outwardly extending flange 38f and a pair of scroll or spiral shaped pad portions 38g to reduce bending stress concentration in the inner convolutions of the springs when they decrease in overall diameter due to transmission of torque in the positive direction of arrow A.

Each arcuate chamber 56 is divided into pairs of variable volume chambers 56a,56b by moveable vanes or pistons 60. Pistons 60 are each separate members but may be affixed together in a manner similar to that in U.S. Pat. No. 4,768,637, which patent is incorporated herein by reference. Each piston 60 includes radially outer and inner surfaces 60a,60b in sliding sealing relation with housing member cylindrical surfaces 42a,42b, an axially facing end surface 60c in sliding sealing relation with housing and surface 42c, and an axially facing end surface 60d in sliding sealing relation with end surface 42d of housing member 40. Axial spacing of piston end surfaces 60c,60d between end surfaces 42c,42d of the chamber and between surface 42d and the adjacent ends of walls 38a,38b is controlled and maintained by an annular shim 62 sandwiched between housing member 40 and a radially inner portion 64a of an annular flange 64. Flange 64 abuts the free axial end of housing wall 38a and is affixed to housing member 38 by appropriate fasteners, such as by two sets of three fasteners 65 which extend through openings in flange 64, openings in pad portion 38d, and opening in flange portion 38f. A radially outer portion 64b of flange 74 includes through openings 74c spaced one hundred-eighty degrees apart an in axial alignment with opening 38h in flange portion 38f.

Housing member 40 includes outer and inner circumferential surfaces 40a,40b in sliding sealing relation with cylindrical wall surfaces 42a,42b and three circumferentially spaced apart through openings 40c which loosely receive round pin lugs 66 fixed at one end to clutch plate 44 and at the other end are slidably received in recesses 60e in the pistons. Since pistons 60 are separate members, lugs 66 position and fix the circumferential spacing of the pistons relative to each other. The view of housing member 40 in FIG. 4 is looking along and leftward in the direction of surface 42d thereof with pin lugs 66 in section and pistons 60 superimposed on surface 42d in phantom lines.

Pistons 60 each include circumferentially oppositely facing surfaces 60f,60g which cooperate with three pairs of restricted passages 40d,40e extending axially through housing member 50 for direction of pressurized make-up oil from torque converter chamber 54 into variable volume chambers 56a,56b. Each pair of passages are circumferentially spaced apart a sufficient distance determined by the circumferential spacing of piston surfaces 60f,60g, and the amount of circumferential free play between pin lugs 66 and through openings 40c. The circumferential free play allows sufficient limited circumferential movement of the pistons relative to housing member 40 for piston end surfaces 60d to close or block the passages associated with variable volume chambers, which at any given time are decreasing in volume, and for the piston end surfaces 60d to move to position opening or unblocking the passages associated with variable volume chambers, which at any given time are increasing in volume.

Spring convolutions 32,34 respectively include radially outer ends 32a,34a and radially inner ends 32b,34b. The ends may be attached in any of several known ways, e.g., such as disclosed in previously mentioned U.S. Pat. No. 5,078,649. Herein it should suffice to say that outer ends 32a,34a are pivotally secured to the radially outer extent of clutch plate 44 by pins 68 and brackets 70, and with the pins locked in place by unshown split pins in known manner. The inner ends 32b,34b of the springs are secured to housing member 38 by pins 72 extending through axially aligned openings 64c,38h and are locked in place in the same manner as pins 68. When the springs are transmitting positive torque and tending to wind up, pivotal movement of the spring ends 32b,34b is limited by scroll pads 38g. When the springs are transmitting negative torque or being acted on by centrifugal forces and therefore tending to unwind or expand radially outward, pins 72 allow free pivotal movement of spring inner ends 32b,34b. Herein, maximum wind-up or unwinding of the spiral spring convolution si limited by engagement of piston surfaces 60f,60g with walls 58. By way of example, wind-up is limited to +52 degrees and unwinding is limited to −25 degrees. The springs are shown in the relaxed state in FIG. 3.

The spiral spring convolutions disclosed in previously mentioned U.S. Pat. No. 5,078,649 have a shape commonly referred to as a spiral of Archimedes wherein each convolution curve is generated by a point moving away from or toward a fixed point at a constant rate awhile the radius vector from the fixed point rotates at a constant rate and that has the equation $\rho = a\theta$ in polar coordinates. The convolutions formed according to this equation increase in radius at a constant rate and have all radially adjacent surfaces radially spaced the same distance apart.

The flex range of such spiral springs readily allow substantial relative rotation between the shafts they interconnect and, therefore, are considered well suited for torsion isolator mechanisms since they allow a damping device connected in parallel therewith to have a long travel for more smoothly damping torsionals. However, high stresses acting at several locations along the length of the convolutions has limited use of such springs in torsion isolator mechanism in applications subjecting the springs to relatively high spin speeds and torque loads encountered in automotive vehicles.

The spiral spring convolutions 32,34, which have substantially the same circumferential length (°720 degrees) and cross-sectional dimensions as the springs in the above mentioned patent, are modified to reduce stress thereon due to torque transmission and due to centrifugal forces acting thereon. Also, flange 44c of plate 44 is provided with cam surfaces 44d,44e circumferentially extending between the outer ends of the convolutions to further reduce stress on the convolutions due primarily to centrifugal forces encountered during relatively high spin speeds while transmitting little or no torque to a load.

The spring modification consists of forming the convolution such that radially adjacent surfaces of radially outer portions of the nested convolutions have a lesser radial spacing therebetween than do radially inner portions of the convolutions. This is accomplished, using the spiral of Archimedes equation, by forming the first half or three hundred-sixty degrees of the convolutions from inner ends 32b,34b with a greater rise rate than the remainder or outer lengths of the convolutions. Alternatively, the spiral of Archimedes equation may be modified to provide convolutions which uniformly decrease in rise rate to provide closer spacing of the outer convolutions. One example of such an equation is given by $\rho = a(\theta)\theta$ wherein the coefficient "a" is now a function of $\theta$ rather than a constant. Springs 80,82 in FIG. 5 are an example of springs formed according to this governing equation.

Stresses due primarily to high spring speeds are reduced by radially inwardly facing cam surfaces 44d,44e having spiral profiles extending substantially the full circumferential distance between outer ends 32a,34a or attachment pins 68. When two nested springs are used, the circumferential distance is approximately one hundred and eighty degrees. The cam surfaces are positioned to be engaged by the adjacent radially outwardly facing surface of the associated convolutions in response to centrifugal forces acting on the springs. The cam surfaces limit radial outward movement of the convolutions due to the centrifugal forces and provide smooth reaction surfaces substantially conforming to the spiral shapes of the convolutions extending between the outer ends of the convolutions.

Figure 5:
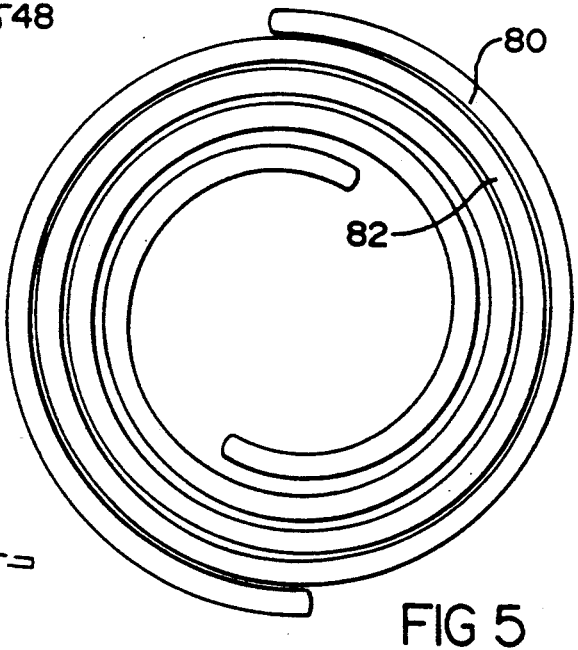
FIG. 5 is an alternative embodiment in reduced size of spiral springs shown in FIGS. 2 and 3.
Figure 6:
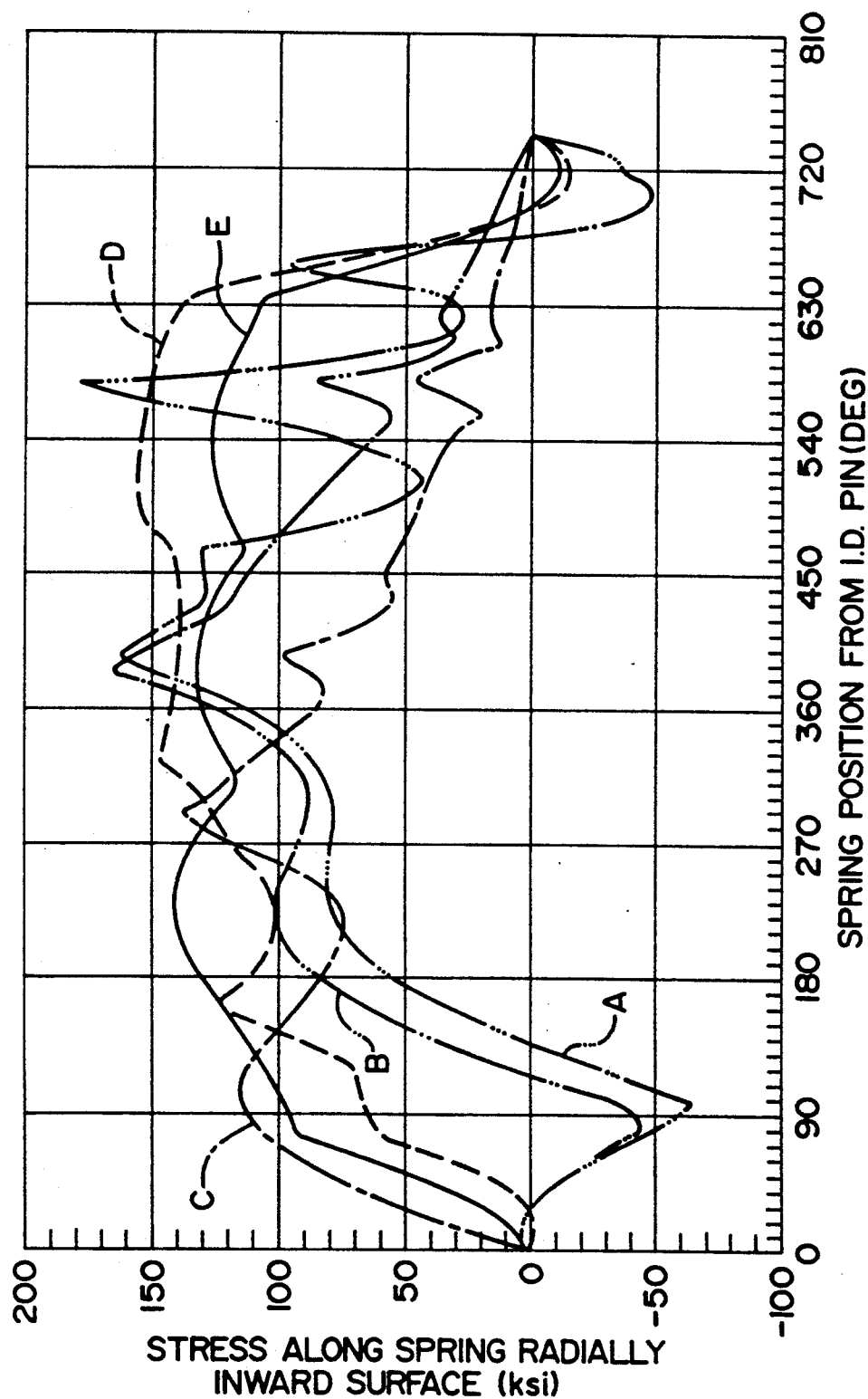
FIG. 6 is a graph illustrating stress on the spiral springs.

The graph of FIG. 6 illustrates stress along the length of the spiral convolutions by a curve A for a baseline spring having the same radial spacing between the nested convolutions and having cam surfaces extending about half the distance between the outer ends of the convolutions, by a curve B for the baseline springs with full cam surfaces 44d,44e according to FIG. 3, and by a curve C for the modified spring of FIG. 5 with the full cam surfaces. Stress curves A,B and C represent stress at the indicated positions along the length of the convolutions with the isolator mechanism not connected to a load and operating at 7000 rpm with the springs flexed to the −25 degrees position, such condition being considered a worse case condition for stress due to centrifugal forces.

The graph of FIG. 6 also illustrates stress along the length of the spiral convolutions by a curve D for the baseline springs at zero rpm and flexed to the +52 degree position, and by curve E for the modified springs of FIG. 5 at zero rpm and flexed to the +52 degree position.

While the embodiments of the present invention have been illustrated and described in detail, it will be apparent that various changes and modifications may be made in the disclosed embodiments without departing from the scope or spirit of the invention. The appended claims are intended to cover these and other modifications believed to be within the spirit of the invention.

What is claimed is:

1. A torsion isolator assembly (30) adapted to be serially connected between input and output drives of a driveline, the assembly including a damping mechanism (36) and resilient means (32,34) connected in parallel; the damping mechanism (36) including first (44,60) and second (38,40) assemblies respectively adapted for driving connection with the input and output drives independent of the resilient means (32,34), the first and second assemblies (44,60 and 38,40) mounted for relative to-and-fro rotation about a common axis in response to relative to-and-fro rotation of the drives effected by flexing of the resilient means and operative to damp flexing of the resilient means (32,34); the resilient means including at least two springs having nested spiral convolutions (32,34) disposed in a common plane normal to the axis with radially adjacent surfaces of the nested convolutions radially spaced apart during a relaxed state of the springs, each spring having a radially outer end (32a,34a) of each convolution connected to the first assembly (44) and a radially inner end (32b,34b) of each convolution connected to the second assembly (38,40), each convolution having a length of at least three hundred degrees about the axis; characterized by:

the spring convolutions (32,34) formed such that the radially adjacent surfaces of the nested convolutions for substantially one-half of each convolution length for the outer ends (32a,34a) having a less radial spacing therebetween than a remainder of the convolutions.

2. The torsion isolator assembly of claim 1, wherein the spring convolutions (32,34) are formed according to a spiral of Archimedes with the convolutions having the lesser radial spacing having a lesser rise rate than the remainder of the convolutions.

3. The torsion isolator assembly of claim 2, wherein:
the first assembly (44,60) including radially inwardly facing cam surface means (44d,44e) of spiral profile extending substantially the full circumferential distance between each attachment means (68,72), each cam surface means (44d,44e) positioned to be engaged by a radially outward facing surface of an associated convolution portion (32,34) in response to centrifugal forces acting on the springs, the cam surface means for limiting radially outward movement of the convolutions due to the centrifugal forces and for providing smooth reaction surfaces substantially conforming to the spiral shapes of the convolution portions extending between the outer ends of the convolutions.

4. The torsion isolator assembly of claim 1, wherein:
the spring convolutions are formed with a rise rate which uniformly decreases from a maximum at the inner ends to a minimum at the outer ends.

5. The torsion isolator assembly of claim 4, wherein:
the first assembly (44,60) including radially inwardly facing cam surface means (44e,44e) of spiral profile extending substantially the full circumferential distance between each attachment means (68,72), each cam surface means (44d, 44e) positioned to be engaged by a radially outward facing surface of an associated convolution portion (32,34) in response to centrifugal forces acting on the springs, the cam surface means for limiting radially outward movement of the convolutions due to the centrifugal forces and for providing smooth reaction surfaces substantially conforming to the spiral shapes of the convolution portions extending between the outer ends of the convolutions.

* * * * *